G. A. ENGLUND.
CHUCK.
APPLICATION FILED MAY 27, 1921.
1,417,981. Patented May 30, 1922.
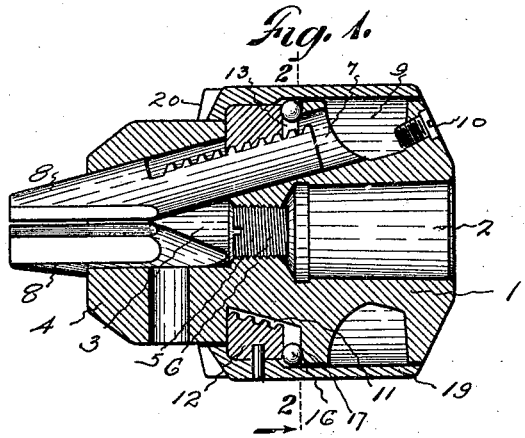
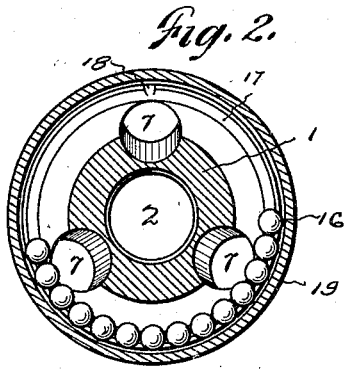
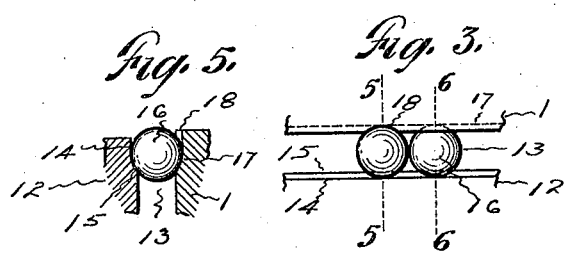
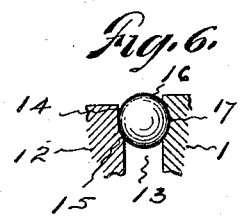
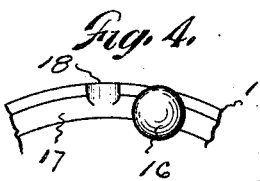
INVENTOR
Gustaf A. Englund
Harry R. Williams
ATTORNEY

UNITED STATES PATENT OFFICE.

GUSTAF A. ENGLUND, OF HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

1,417,981. Specification of Letters Patent. Patented May 30, 1922.

Application filed May 27, 1921. Serial No. 473,178.

*To all whom it may concern:*

Be it known that I, GUSTAF A. ENGLUND, a citizen of the United States, residing at Hartford, in the county of Hartford and State of Connecticut, have invented a new and useful Improvement in Chucks, of which the following is a specification.

This invention relates to the class of chucks which have three longitudinally movable jaws and which are designed to be used on drill presses, lathes, screw machines and the like, for holding drills, taps and similar metal boring and threading tools.

The object of the invention is to produce a chuck of this type having parts which are simple to manufacture and easy to assemble, and which can be closed tightly with but little effort on the shanks of boring tools or on rods of indefinite length.

This object is attained by forming the body of the chuck with an axial opening from end to end and threading the middle portion of the wall of the opening for receiving a threaded plug that is screwed in when it is desired to use the chuck for holding drills but which is removed when the chuck is to be employed for gripping rods, and by providing a ready means for inserting and retaining during assembly an annular row of balls between the body and the jaw moving nut thereby reducing the cost of manufacture.

In the accompanying drawings Fig. 1 shows a central longitudinal section of a chuck that embodies the invention. Fig. 2 shows a transverse section of the chuck on the plane indicated by the dotted line 2—2 on Fig. 1 looking toward the rear with the jaws omitted. Fig. 3 is a detail on larger scale illustrating the means provided for inserting and retaining the balls which facilitate the opening and closing of the jaws. Fig. 4 is a view showing a detail of the body. Fig. 5 is a section on the plane indicated by the dotted line 5—5 on Fig. 3. Fig. 6 is a section on the plane indicated and the dotted line 6—6 on Fig. 3.

The body 1 of the chuck has the usual opening 2 at the rear for the reception of the arbor or spindle of the machine with which it is to be used, and an opening 3 through the nose 4 for the shank of the tool. In the chuck shown these openings are connected by an opening 5 with a threaded wall into which a threaded plug 6 may be screwed. The plug is screwed in when the chuck is used for holding boring or threading tools in order to afford a stop for the end of the shank of the tool. When a rod is to be gripped by the chuck, the plug is unscrewed and removed. Bores 7 are made on an incline through the nose into the body for the reception of the jaws 8. The jaws are short sections of round rod with their sides at the outer ends chamfered as usual so that they may be closed together and grip a piece of small diameter and their sides at the inner ends are formed with screw teeth. The body of the chuck near the rear end is desirably cut away for the purpose of lightening the weight and forming a chamber 9 into which lubricant may be placed. A screw plug 10 is turned into the back of the body to provide means which permit the insertion of the lubricant.

Around the body near the middle of its length is an annular recess 11 in which the sectional nut 12 is located. The inner wall of this nut is threaded to fit the teeth on the jaws. The outer edge of the nut on the rear face is ground or cut away so as to form a portion of a ball race-way 13. The side face 14 of this race is flat but the inner wall 15 is curved so as to extend under and support the balls 16 (Figs. 5 and 6). In the wall of the body that faces the nut is a groove 17 which is curved in cross section and it extends around the body near the outer edge. This groove in the body is formed so as to receive and enclose portions of the surfaces of the balls (Figs. 3 and 6.) In one locality a notch 18 is cut in the edge of the body to permit the balls to be entered into the race-way between the body and nut (Figs. 3 and 4). The balls are inserted between the body and nut by passing them through the notch 18 until they fill the raceway and form a continuous ring. As the balls pass into the groove they are retained so that they cannot drop from position. After the balls are inserted a sleeve 19 is slipped on the body over the nose and then fastened to the nut in any approved manner. On the front end of the sleeve are teeth 20 for engaging with the teeth of a pinion key such for instance as is shown in the Jacobs Patent No. 1,123,541 of January 5, 1915.

With this construction the parts are simple to manufacture and the balls are easily inserted and retained during the operation of assembling them without danger of their dropping from between the body and nut. The central plug when used provides a stop for locating the end of the threading, boring or other tool, and when the plug is removed the chuck may be used for holding a rod.

The invention claimed is:

A chuck having a body with inclined jaw openings and an annular recess communicating with the jaw openings, jaws with teeth on their backs loosely located in the jaw openings, a nut located in said annular recess and having threaded engagement with the teeth on the jaws, balls located between the nut and body, the rear wall of said nut having its outer edge cut away to form a ball-race that encircles a portion of the inner surfaces of the balls only and the rear wall of said annular recess in the body having near its outer edge a groove that forms a ball-race which encircles a portion of the inner and outer surfaces of the balls with a small portion of the edge of the body from said groove outward cut away at one locality, whereby the balls are dropped into said races and are retained from outward displacement by the outer section of the wall of the groove in the body, and a sleeve surrounding the body over the ball race-ways and fastened to the nut.

GUSTAF A. ENGLUND.